(12) United States Patent
Langona (10) Patent No.: US 10,789,842 B2
(45) Date of Patent: Sep. 29, 2020

(54) APPARATUS AND METHODS FOR DETECTION AND NOTIFICATION OF ICY CONDITIONS USING INTEGRATED VEHICLE SENSORS

(71) Applicant: Ford Global Technologies, LLC, Dearborn, MI (US)

(72) Inventor: Karen Langona, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/302,149

(22) PCT Filed: May 17, 2016

(86) PCT No.: PCT/US2016/032884
§ 371 (c)(1),
(2) Date: Nov. 16, 2018

(87) PCT Pub. No.: WO2017/200532
PCT Pub. Date: Nov. 23, 2017

(65) Prior Publication Data
US 2019/0189008 A1     Jun. 20, 2019

(51) Int. Cl.
| G08G 1/09 | (2006.01) |
| G08G 1/0967 | (2006.01) |
| G08G 1/005 | (2006.01) |
| G08G 1/01 | (2006.01) |
| G01C 21/20 | (2006.01) |
| B60W 30/00 | (2006.01) |

(52) U.S. Cl.
CPC ....... *G08G 1/096791* (2013.01); *B60W 30/00* (2013.01); *G01C 21/20* (2013.01); *G08G 1/005* (2013.01); *G08G 1/0112* (2013.01); *G08G 1/0133* (2013.01); *G08G 1/0141* (2013.01); *G08G 1/096725* (2013.01); *G08G 1/096758* (2013.01); *G08G 1/096775* (2013.01); *B60W 2555/20* (2020.02)

(58) Field of Classification Search
None
See application file for complete search history.

(56) References Cited

U.S. PATENT DOCUMENTS

| 8,890,713 | B2* | 11/2014 | Breuer | B60Q 9/00 340/901 |
| 2014/0049405 | A1* | 2/2014 | Breuer | B60Q 9/00 340/905 |
| 2015/0254781 | A1* | 9/2015 | Binion | G07C 5/0858 701/32.2 |

* cited by examiner

*Primary Examiner* — Julie B Lieu
(74) *Attorney, Agent, or Firm* — Brandon Hicks; Eversheds Sutherland (US) LLP (57) ABSTRACT

Methods and apparatus for detection and notification of icy conditions using integrated vehicle sensors. An example apparatus includes a sensor to detect an icy condition adjacent to a door of a vehicle, a processor to determine if a person is exiting the vehicle, and a human-machine interface to alert the person exiting the vehicle of the icy condition.

16 Claims, 9 Drawing Sheets

APPARATUS AND METHODS FOR DETECTION AND NOTIFICATION OF ICY CONDITIONS USING INTEGRATED VEHICLE SENSORS

FIELD OF THE DISCLOSURE

This disclosure relates generally to detection of icy conditions and, more particularly, to methods and apparatus for detection and notification of icy conditions using integrated vehicle sensors.

BACKGROUND

Approximately one million weather-related crashes each year cause thousands of deaths and injuries to the drivers and passengers of the involved vehicles. The risk of weather-related crashes increases in the winter due to the presence of ice or icy conditions on roads, driveways, parking lots, etc. Additionally, fall-related injuries to pedestrians, drivers exiting vehicles, and bicyclists increase during the winter months due to icy conditions on sidewalks or other pedestrian areas.

SUMMARY

An example apparatus includes a sensor to detect an icy condition adjacent to a door of a vehicle, a processor to determine if a person is exiting the vehicle, and a human-machine interface to alert the person exiting the vehicle of the icy condition.

An example method includes detecting an icy condition adjacent a door of a vehicle, determining that a person is exiting the vehicle through the door, and alerting the person prior to the exiting the vehicle that the icy condition exists.

Another example method includes detecting an icy condition at a first location via a sensor of a vehicle, transmitting data indicative of the icy condition to a remote server, determining a pedestrian is in proximity to the first location via a portable device associated with the pedestrian, and transmitting an alert from the remote server to the portable device indicating the icy condition at the first location.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

An ice detection system as described herein is operative to warn drivers or other persons in a vehicle, pedestrians, and other vehicles of icy conditions detected adjacent to a vehicle. In some examples, an apparatus includes a sensor to detect icy conditions adjacent to a vehicle, a global positioning system module to determine a location of the vehicle, a human-machine interface to alert a person (e.g., a driver exiting the vehicle) of the icy conditions, and a processor to transmit information indicative of the icy conditions and location to a remote server and adjust a handling system of the vehicle based on the icy conditions.

A sensor integrated into a vehicle is operative to detect an icy condition adjacent to a door of the vehicle. The sensor may be an infrared sensor, a temperature sensor, and/or a humidity sensor. If a processor of the vehicle determines a person is exiting the vehicle, a human-machine interface alerts the person, prior to the person exiting the vehicle, of the icy condition adjacent the door of the vehicle. The processor may determine that the person is exiting the vehicle if the vehicle is in park, an engine of the vehicle is off, or the door of the vehicle is open. The processor may also determine a risk level of the icy condition and warn the person using a first alert type if the risk level is low and a second alert type if the risk level is high.

If the processor receives a notification of a second icy condition detected by a second vehicle in a second location, a human-machine interface of a first vehicle may alert a person in the first vehicle if a location of the first vehicle is proximate the second icy condition. The notification of the second icy condition may include a map, which may be presented to the person via the human-machine interface. The human-machine interface includes a display and/or an audio system, and the alerts may be audible alerts and/or visual alerts.

The processor may also detect that a person is returning to the vehicle and alert the person, prior to the person entering the vehicle, of the icy condition adjacent the door of the vehicle. Detecting the person is returning to the vehicle may include detecting a portable device (e.g., a smartphone, a wearable device) associated with the person is in proximity to the vehicle. The device may be paired with the vehicle using Bluetooth, a cellular network, and/or Ford SYNC. The alert to the person prior to the person entering the vehicle includes transmitting an alert to the device associated with the person when the device is in proximate the vehicle.

The processor may also transmit information indicative of an icy condition and a location of the icy condition to a remote server. The remote server may relay the icy condition information and the location to additional vehicles and portable devices in proximity to the location. A pedestrian in proximity to the first location may receive a notification of the icy condition via a portable device (e.g., a smartphone, a wearable device) associated with the pedestrian. An alert may also be transmitted to a second vehicle in proximity to the location of the icy condition. The alert may be transmitted from a remote server or remote storage to the portable device associated with the pedestrian and the second vehicle via a relay station. The portable device associated with the pedestrian may also determine, based on information on the portable device, if the pedestrian will encounter additional icy conditions detected and transmitted to the remote storage. If the pedestrian will encounter additional icy conditions, the portable device may provide a notification to the pedestrian and/or suggest an alternate route to the pedestrian.

Figure 1:
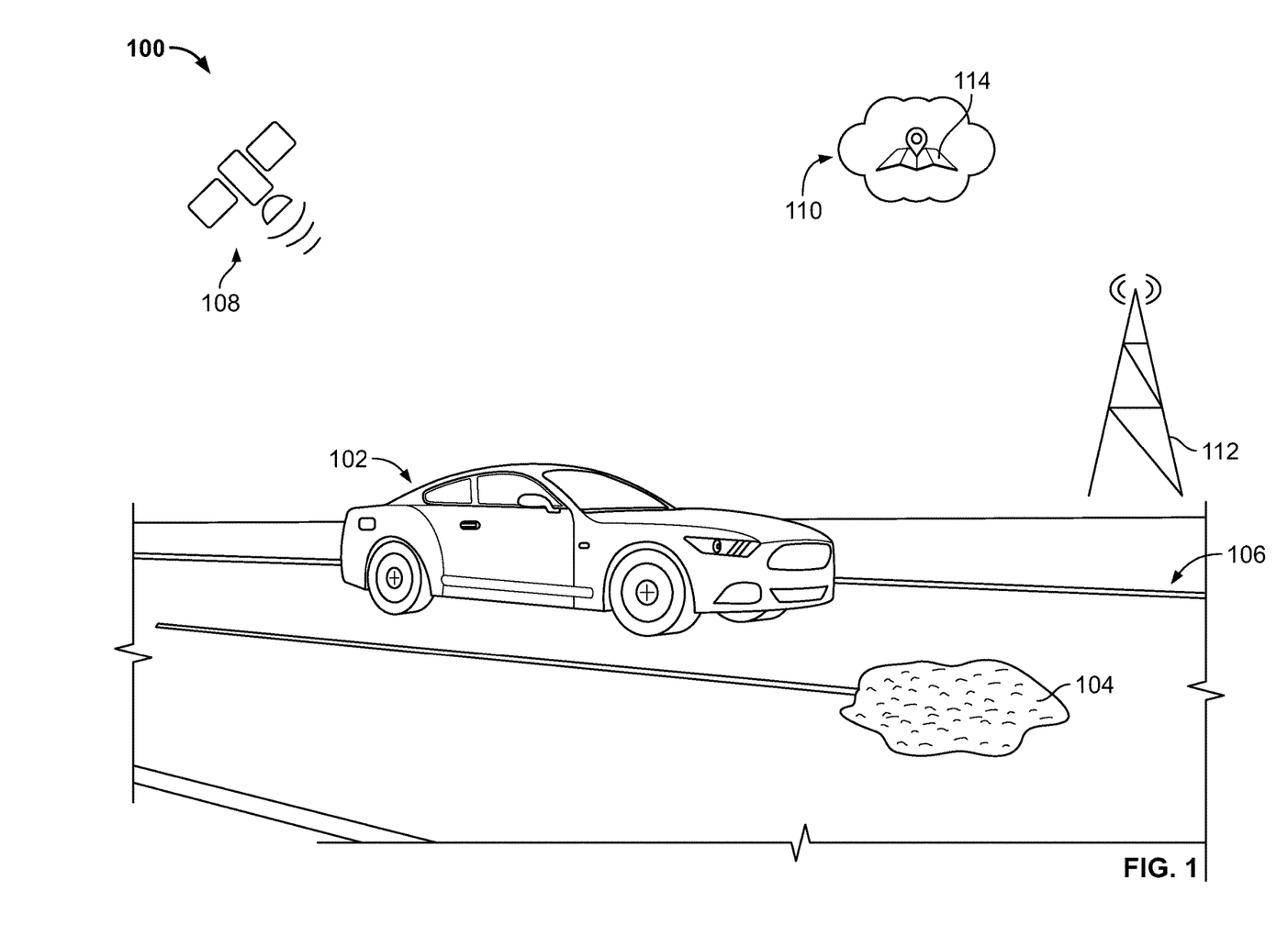
FIGS. 1 and 2 represents example environments in which the apparatus and methods disclosed herein may be implemented.

FIG. 1 represents an example environment 100 in which the apparatus and methods disclosed herein may be implemented. The example environment 100 includes an example vehicle 102 operative to detect icy conditions 104 (e.g., patches of ice) on a surface 106 (e.g., a road, a parking lot, a sidewalk, etc.) adjacent to the vehicle 102. The vehicle 102 may communicate information indicative of the detected icy conditions 104 to a person (e.g., a driver) via a human-machine interface (HMI) (e.g., HMI 310 of FIG. 3) (e.g., a driver interface, a display, speakers, etc.) integrated into the vehicle 102. While the term "driver" is used throughout the examples below, it should be understood that the examples described below may be applied to any other person associated with the vehicle 102 such as a passenger of the vehicle 102.

In some examples, the vehicle 102 is an autonomous vehicle operative to detect and/or avoid the icy conditions 104. In the illustrated example of FIG. 1, the icy conditions 104 detected by the vehicle 102 are located in a path of travel of the vehicle 102 but, alternatively, the icy conditions 104 may be in any position relative to the vehicle 102 or the path of the vehicle 102. Upon detection of the icy conditions 104, a location of the vehicle 102 and/or the icy conditions 104 is determined using one or more satellites 108 of a global positioning system (GPS) and/or a GPS receiver or module (e.g., the GPS module 306 of FIG. 3) integrated with the vehicle 102.

The vehicle 102 may be operative to communicate information relating to the detected icy conditions 104 and the determined location to a portable device (e.g., a device paired with the vehicle 102 via Bluetooth, a device associated with the driver, etc.) and/or one or more additional vehicles using any suitable form of wireless communication, such as a cellular connection, a Wi-Fi connection, a Bluetooth connection, Ford SYNC Applink, etc. Additionally, the vehicle 102 may receive information related to icy conditions 104 and the locations of the icy conditions 104 detected by the other vehicles (e.g., the vehicles 202 of FIG. 2).

The vehicle 102 may transmit data or information including the information relating to the detected icy conditions 104 and locations of the icy conditions 104 to remote storage 110 via a communication tower or relay station 112. In some examples, the icy conditions 104 are ranked or evaluated to indicate how potentially dangerous each of the icy conditions 104 may be. The icy conditions 104 may be assigned a corresponding color or number to indicate a risk level (e.g., a level of potential danger, a severity, etc.) associated with each of the icy conditions 104. In some examples, the remote storage 110 includes a map 114, which may be updated to indicate the detected icy conditions 104 and the rankings at the location associated with the icy conditions 104. The map 114 and the information stored on the remote storage 110 are updated in real-time with the information received from, for example, the vehicle 102.

Figure 2:
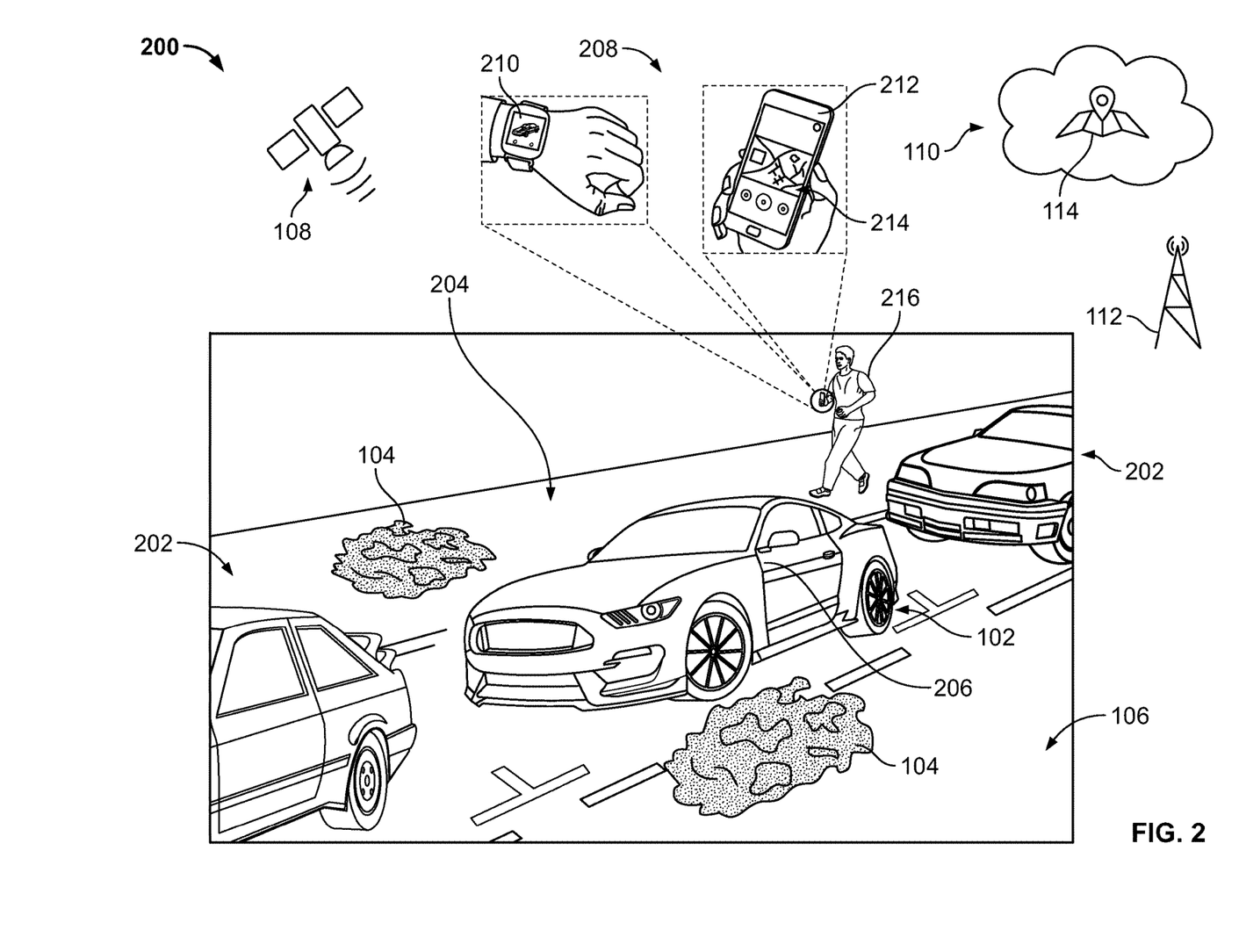

The remote storage 110 is operable to communicate with additional vehicles and portable devices (e.g., the example smartphone 212 of FIG. 2, the example wearable device 210 of FIG. 2). Icy conditions 104 detected by additional vehicles may be communicated to the vehicle 102 from the remote storage 110. The vehicle 102 may reroute to avoid the additional icy conditions 104 and/or may alert the driver via the HMI about the additional icy conditions 104. In some examples, the vehicle 102 may access the map 114 to reroute and/or to plan a route using a navigation system integrated into the vehicle 102.

FIG. 2 represents another example environment 200 in which the apparatus and methods disclosed herein may be implemented. FIG. 2 depicts the example vehicle 102 parking between additional vehicles 202, which are parked adjacent to a sidewalk 204. Alternatively, the additional vehicles 202 may be located in a parking lot, a driveway, a parking garage, etc., or may be driving on a road (e.g., the road surface 106 of FIG. 1 and FIG. 2). The icy conditions 104 can be detected by the vehicle 102 and/or the additional vehicles 202 in a variety of locations, including but not limited to the parking lot, the driveway, the parking garage, the sidewalk 204, and the road 106.

If the vehicle 102 detects icy conditions 104 on the sidewalk 204 adjacent to the vehicle 102 or the additional vehicles 202, the vehicle 102 may transmit information related to the icy conditions 104 to the remote storage 110. The vehicle 102 may also be operative to alert the driver of the icy conditions 104 that are in proximity to a door 206 (e.g., a driver-side front door) and warn the driver, prior to the exiting the vehicle 102, to be cautious when exiting the vehicle 102. The vehicle 102 may determine the driver is exiting the vehicle 102 when the vehicle 102 is in a parked position, the engine is off, and/or the door 206 is open. The alert provided to the driver prior to exiting the vehicle 102 may include an audible or visual alert warning the driver that the icy conditions 104 are detected adjacent to the door 206 of the vehicle 102. Additionally, the vehicle 102 may also be operative to warn passengers exiting the vehicle 102 that the icy conditions 104 exist adjacent to one or more passenger doors. In some examples, the vehicle 102 is operative to detect when the driver is returning and warn the driver of the icy conditions 104 adjacent to the door 206 prior to the driver approaching the icy conditions 104.

Similar to the vehicle 102, the additional vehicles 202 may be operative to communicate (e.g., transmit, receive), via any suitable form of wireless communications, information related to the icy conditions 104 with the remote storage 110, the vehicle 102, portable devices (e.g., a smartphone 212, a wearable device 210), etc. via the relay station 112. The additional vehicles 202 may be operative to detect the icy conditions 104 on adjacent surfaces (e.g., the road surface 106, the parking area, the sidewalk 204), similar to the vehicle 102. In some examples, the additional vehicles 202 are not operable to detect the icy conditions 104, but may receive information related to the icy conditions 104 and/or relay the information to other vehicles (e.g., the example vehicle 102), portable devices 208 (e.g., a smartwatch 210, a smartphone 212, etc.), and/or the remote storage 110. The additional vehicles 202 are also operative to communicate with the GPS satellites 108 to provide location data to transmit or receive information related to the icy conditions 104. For example, the additional vehicles 202 may receive information related to icy conditions 104 based on the current location and/or may include location information with data related to the icy conditions 104 that is transmitted to the remote storage 108. In some examples, the vehicles 102, 202 update the remote storage 110 with the location of the detected icy conditions 104, which is determined using the GPS satellite 108.

As described in conjunction with FIG. 1, the remote storage 110 updates the map 114 to indicate the icy conditions 104 and may transmit the map 114 and/or the information related to the icy conditions 104 to the additional vehicles 202 and/or a portable device (e.g., the smartphone 212, the smartwatch 210). In some examples, the portable device 208 may be associated with a driver of the vehicle 102, the additional vehicles 202, bicyclists, motorcyclists, or a pedestrian 216. The example portable device 208 includes the FordPass application 214 or other application (e.g., any application operable to communicate with the remote storage 110 and provide a user with information related to icy conditions 104) and is able to receive information related to the icy conditions 104 detected by the vehicle 102 or the additional vehicles 202. The FordPass application 214 is operative to provide a notification (e.g., using push notifications) or an alert to a user (e.g., the pedestrian 216, a driver of a vehicle 102, 202, a bicyclist) of the portable device 208. The user may also use the FordPass application 214 to access the map 114 indicating the icy conditions 104 and the severity (e.g., risk level) of the icy conditions 104 for a location selected by the user (e.g., a current location, a destination location, etc.). The FordPass application 214 may be operative on the portable device 208, including smartphones 212, tablets, smartwatches 210, or any other device capable of using the FordPass application 214.

For example, the pedestrian 216 may use the FordPass application 214 on the portable device 208 to access the map 114 to identify icy or potentially icy conditions 104 on the sidewalk 204 and/or the road 106. The icy conditions 104 on the sidewalk 204 may be estimated based on the icy conditions 104 on the road 106 in proximity to the sidewalk 204, detected by a vehicle (e.g., the example vehicle 102, additional vehicles 202) parked or driving adjacent to the sidewalk 204 such that the vehicle 102 can detect ice on the surface of the sidewalk 204, or reported by other users of the FordPass application 214. In some examples, the vehicle 102 is operative to detect the icy conditions 104 in proximity to the vehicle 102, but is not operative to distinguish between the road surface 106 and the sidewalk surface 204. In such examples, the FordPass application 214 may notify the pedestrian 216 of all icy conditions 104 nearby, including the icy conditions 104 on the road surface 106, which may indicate that the sidewalk surface 204 adjacent the road surface 106 is potentially icy.

The FordPass application 214 may additionally allow users (e.g., a driver, a pedestrian, a passenger, etc.) to update locations as having icy conditions 104. For example, if a pedestrian 216 encounters a patch of ice on a sidewalk 204 that does not include a previously detected icy condition 104, the pedestrian 216 may manually update the map 114 using the portable device 208 to provide information related to the icy conditions 104. Enabling the user to update the map 114 provides more data that can be shared with other users of the FordPass application 214 and/or vehicles (e.g., vehicle 102, additional vehicles 202) operative to access the map 114 or data. The pedestrian 216 may also be able to designate the type of surface (e.g., the sidewalk 204) on which the icy condition 104 was encountered.

For example, if a second pedestrian walking on the sidewalk 204 prior to the example pedestrian 216 encountered the icy conditions 104 on the sidewalk 204, the second pedestrian may use the FordPass application 214 to report the icy conditions 104 on the sidewalk 204 (e.g., by updating the map 114). The location of the icy conditions 104 reported by the second pedestrian may be determined based on a location of a portable device 208 associated with the second pedestrian determined using the GPS satellite 108 or may be manually entered by the second pedestrian when reporting the icy conditions 104 on the sidewalk 204.

The pedestrian 216 may access the map 114 using the FordPass application 214 to identify icy conditions 104 between a current location and a destination location (e.g., walking to a restaurant (destination location) from work (current location)) and may use the information displayed on the map 114 (e.g., the location of the icy conditions 104, a severity of the icy conditions 104) to plan a safe route from the current location to the destination location. For example, the FordPass application 214 may select a route that minimizes the icy conditions 104 encountered by the user or vehicle 102 and/or minimizes the risk level of the icy conditions 104 encountered. Alternatively or additionally, the FordPass application 214 may access a calendar associated with the portable device 208 and may notify the user of the icy conditions 104 along a route between the current location of a user and a location associated with a future calendar appointment. For example, the FordPass application 214 may detect, using the GPS satellite 108, that the user is at a first location (e.g., home) and has a future calendar event associated with a second location (e.g., work) and may provide a summary of icy conditions 104 along the route the user is likely to take to the second location from the first location. (e.g., shortest route, typical travel route, etc.) and/or suggest an alternate route (e.g., a safest route). The route evaluated or suggested by the FordPass application 214 may include walking, driving, or a combination of walking and driving based on the proximity of the first location to the second location and the available modes of transportation (e.g., public transportation, vehicular transportation, pedestrian traffic, bicycles or bicycle sharing services etc.).

The FordPass application 214 may additionally notify the pedestrian 216 that the icy conditions 104 are detected in proximity to the current location of the pedestrian 216 (determined using the GPS satellite 108) and the information stored on the remote storage 110 that may be transmitted to the portable device 208 based on the current location of the portable device 208. The portable device 208 may alert the user or pedestrian 216 of nearby icy conditions 104 using a notification feature (e.g., push notifications) of the portable device 208 and the FordPass application 214.

In examples where the driver is using the FordPass application 214 on the portable device 208, alerts related to the icy conditions 104 may be transmitted via the FordPass application 214 on the portable device 208 in addition to or instead of a display or speaker within the vehicle 102. For example, as the driver approaches the vehicle 102, the FordPass application 214 on the portable device 208 may detect the proximity of the driver to the vehicle 102 (e.g., using the GPS satellite 108, based on a proximity of the portable device 208 associated with the driver and/or paired to the vehicle 102 using Bluetooth, Ford SYNC, etc.). The FordPass application 214 may then warn the driver, prior to the driver entering the vehicle 102 or approaching the door 206, if any icy conditions exist adjacent to the door 206 of the vehicle 102. Similarly, the FordPass application 214 may warn potential passengers of the vehicle 102 if icy conditions 104 exist adjacent to passenger doors of the vehicle 102 prior to the passenger(s) entering the vehicle 102. Any passenger having a portable device 208 with the FordPass application 214 can be warned of icy conditions 104 adjacent to the passenger doors.

The FordPass application 214 may allow drivers of any vehicle capable of connecting to a portable device 208 (e.g., using Ford SYNC Applink, Bluetooth, etc.) to receive notifications of icy conditions 104 while driving via the FordPass application 214. For example, the additional vehicles 202 may not be operative to detect the icy conditions 104, but may be operative to connect to a portable device 208 and, thus, may still receive notifications related to the icy conditions 104 on roads 106 while driving using the FordPass application 214 on the portable device 208. If the portable device 208 is also navigating (e.g., using a navigation application, using the FordPass application 214, etc.), the FordPass application 214 may also be operative to alert a driver of the additional vehicle 202 of icy conditions 104 on the route and/or suggest alternative routes.

The FordPass application 214 may also be used by road maintenance workers to provide better maintenance during winter months when icy conditions 104 on roads 106 are common. For example, a road maintenance worker may have a portable device 208 with the FordPass application 214. Using the map 114 on the FordPass application 214, the road maintenance worker can identify locations with icy conditions 104 and the severity of the icy conditions 104. The road maintenance worker may use the map 114 to determine a route for a salt truck and/or snow removal truck that provides road maintenance to the locations with icy conditions 104 and/or severe icy conditions 104, while not providing road maintenance to locations without icy conditions 104. Using the FordPass application 214 to identify locations or roads 106 that require maintenance may be more efficient and cost effective than providing maintenance to all roads 106 and locations by enabling road maintenance workers to focus maintenance efforts on the locations with the most severe icy conditions 104. In some examples, the road maintenance workers have vehicles with the Ford SYNC Applink and/or ice detection sensors integrated into the vehicle and are operative to communicate directly with the remote storage 110 to receive notifications including locations or roads 106 that have icy conditions 104 and may need maintenance.

Figure 3:
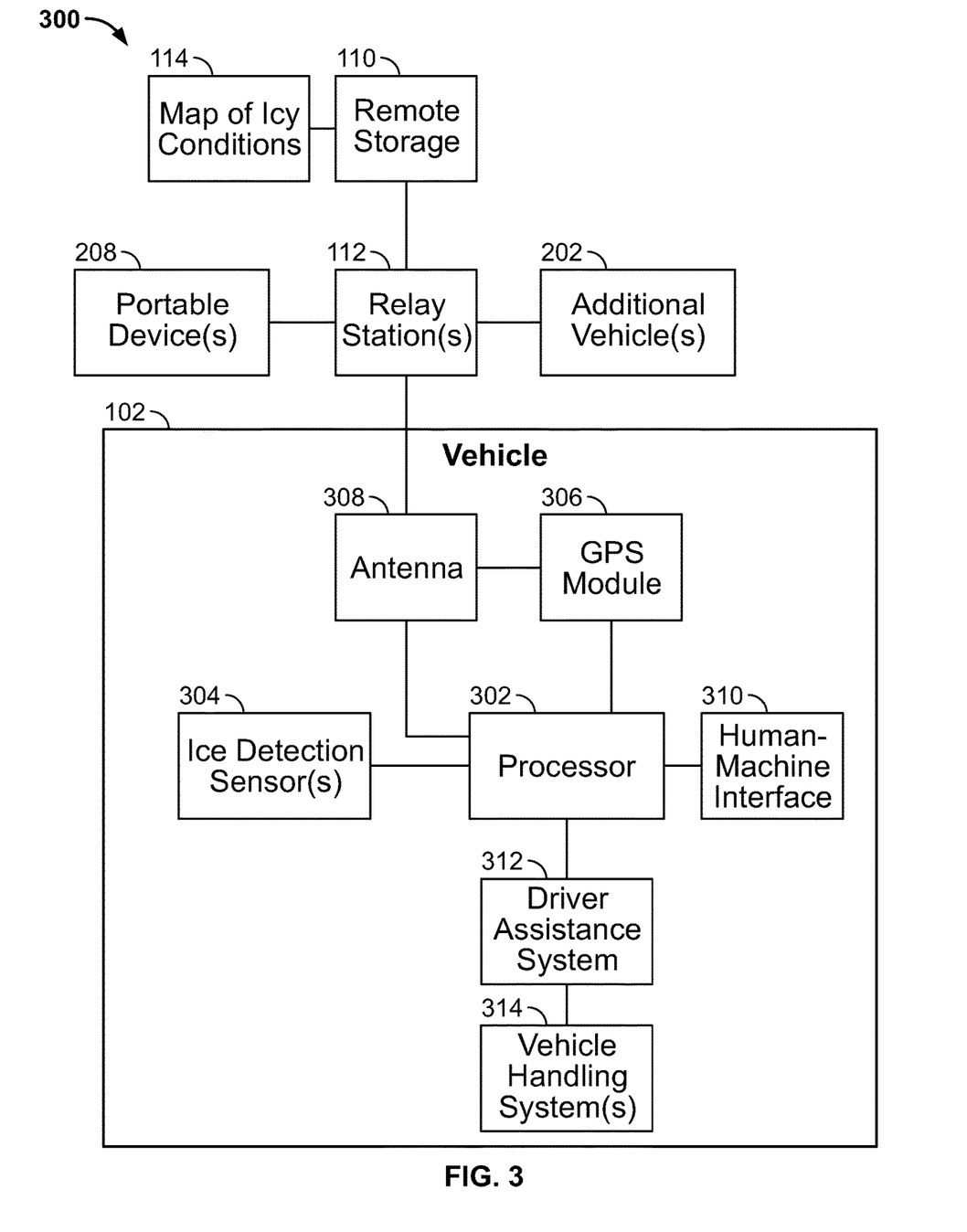
FIG. 3 is a diagram of an apparatus that may be used to implement the example methods described herein.

FIG. 3 is a diagram of an apparatus 300 that may be used to implement the example methods described herein. The example apparatus 300 includes a processor 302 disposed within the vehicle 102. The processor 302 is operative to provide communication between one or more of the components of the vehicle 102 and the remote storage 110. The processor 302 is operatively coupled to one or more ice detection sensor(s) 304 that detect icy conditions 104 on road surfaces 106 and/or sidewalks 204 adjacent to the vehicle 102. The ice detection sensor(s) 304 may include infrared ice detection sensors, temperature sensors, humidity sensors, or any other types or combination of sensors operative to detect icy conditions 104 on road surfaces 106 and/or sidewalks 204. The ice detection sensors 304 may be located in various positions around the perimeter of the vehicle 102 to detect icy conditions 104 on all sides of the vehicle 102 and/or adjacent to doors 206 of the vehicle 102. The ice detection sensors 304 are operable to collect information related to icy conditions 104 and, via the processor 302, relay the collected information to other components of the vehicle 102 (e.g., a vehicle handling system 314, a human-machine interface 310, etc.) and to the remote storage 110. The processor 302 may also be operative to determine a risk level of the icy conditions 104 detected by the ice detection sensors 304.

The processor 302 may also be operatively coupled to a GPS module 306 disposed within the vehicle 102 and communicatively coupled to one or more GPS satellites 108 to determine a location of the vehicle 102 and/or the icy conditions 104 detected using the ice detection sensors 304. The GPS module 306 may be operatively coupled to an antenna 308 to enable communication between the GPS module 306 and the one or more GPS satellites 108. The antenna 308 may also enable communication (direct or indirect) between the processor 302 and the one or more relay stations 112, the remote storage 110, the additional vehicles 202, and/or the portable devices 208. The antenna 308 may transmit information related to icy conditions 104 to the relay station(s) 112, which may relay the information to portable devices 208, the remote storage 110, or additional vehicles 202. Additionally or alternatively, the antenna 308 may be operative to transmit information related to icy conditions 104 directly to the additional vehicles 202. The antenna 308 is also operative to receive information related to icy conditions 104 from the remote storage 110, additional vehicles 202, portable devices 208, and/or relay stations 112.

The processor 302 may be operatively coupled to the human-machine interface (HMI) 310, which may alert the driver and/or passengers of the vehicle 102 about the icy conditions 104 detected by the ice detection sensors 304 and/or received via the antenna 308. The HMI 310 may be integrated into the vehicle 102 or may be an after market addition to the vehicle 102 or a portable device 208 mounted to the vehicle 102 to provide navigation or other alerts to the driver. Upon detection of icy conditions 104 using the ice detection sensors 304 or receipt of icy condition information via the antenna 306, the processor 302 may indicate the icy conditions 104 to a driver via the HMI 310. The HMI 310 may include a display and/or speakers to communicate audible and/or visual alerts to the driver. In some examples, the HMI 310 is operative to display the map 114 from the remote storage 110 indicating the locations of detected icy conditions 104 in proximity to (e.g., within a pre-determined distance, such as 500 feet) the vehicle 102. The map 114 may also include an indication of the severity (e.g., risk level) of each of the detected icy conditions 104 displayed on the map 114. In some examples, the risk levels associated with the icy conditions 104 may vary based on, for example, the size of the icy conditions 104, the location of the icy conditions 104 (e.g., a high traffic location or a low traffic location), other weather conditions (e.g., temperature, humidity), and/or any other factors that may affect the risk level of the icy conditions 104. The risk levels of the icy conditions 104 may be displayed on the map 114 using different colors or numbers identifying the high risk areas, intermediate risk areas, and low risk areas. The HMI 310 is also operative to warn the driver or passenger that is exiting the vehicle 102 that icy conditions 104 exist adjacent to a door 206 of the vehicle 102. In some examples, the processor 302 may provide a different type of alert based on how the processor 302 determines the driver or passenger is exiting the vehicle 102. For example, the processor 302 may provide a visual alert via the HMI 310 if the processor 302 detects the vehicle 102 is in a parked position, but may provide an audible alert via the HMI 301 if the processor 302 detects the door 206 is open. The HMI 310 may be operative to communicate with one or more portable devices 208 associated with the driver (e.g., the smartphone 212, the smartwatch 210) via Ford SYNC Applink. In some examples, the HMI 310 may use Ford SYNC Applink to communicate with the additional vehicles 202, other devices using Applink, the relay stations 112, or the remote server 110.

The processor 302 may also be operatively coupled to a driver assistance system 312, which may assist the driver in controlling the vehicle 102 in icy conditions 104. If the vehicle 102 is in proximity to icy conditions 104 (e.g., within a designated distance of icy conditions 104, such as 500 feet), the driver assistance system 312 may be operative to control one or more of vehicle handling systems 314 (e.g., brakes, collision avoidance, steering, etc.) based on information from the ice detection sensors 304 or other sensors of the vehicle 102 and/or the processor 302 (e.g., information received from the remote storage 110). For example, if an icy condition 104 is in proximity to the vehicle 102, the driver assistance system 312 may detect that the brakes are not being properly applied and may assume control of the brake system to mitigate or lessen adverse effects (e.g., sliding, crashing, etc.) of the icy conditions 104. The driver assistance system 312 may also be operative to control other vehicle handling systems 314, including the steering system and collision avoidance system.

In some examples, information from additional sensors disposed within the vehicle 102 may detect an operational status of the vehicle handling systems 314 (e.g., brakes). The vehicle 102 may then use the information from the ice detection sensors 304 and any additional sensors to determine if the vehicle handling systems 314 should be adjusted and may automatically adjust the vehicle handling systems 314 using the driver assistance system 312. In some examples, autonomous vehicles may use the information from the ice detection sensors 304 and the additional sensors related to the vehicle handling systems 314 to automatically adjust the vehicle handling in areas where icy conditions 104 are detected. For example, the vehicle 102 may automatically slow down upon detection of icy conditions 104 or, if possible, automatically re-direct the path of the vehicle 102 to avoid contact with the icy conditions 104.

Upon collecting data related to one or more icy conditions 104 at one or more locations, the processor 302 is operable to communicate the data, via the antenna 308, to the relay station 112. In some examples, multiple relay stations 112 may be in range of communication with the vehicle 102 and the vehicle 102 communicates the data related to the icy conditions 104 to the relay station 112 nearest to the vehicle 102. Alternatively, the vehicle 102 may communicate the data related to the icy conditions 104 to all of the relay stations 112 within communication range of the vehicle 102. The relay station 112 and the vehicle 102 may communicate data using any form of wireless communication, including cellular signals, Wi-Fi, or any other form of wireless communication. The relay station 112 may simultaneously transmit and receive information from any of the vehicle 102, additional vehicles 202, portable devices 208, remote storage 110, other relay stations 112, and any other vehicle or device operative to communicate with the remote storage 110.

The relay station 112 is operable to communicate the data to the remote storage 110 using, for example, wireless cellular communication. The remote storage 110 may be a remote server functioning as a cloud-based backend or distributed system able to accommodate variable input and output (e.g., updates, inquiries, etc.). The remote storage 110 may also rank the icy conditions 104 based on a severity or risk level. The risk levels may include any number of levels and may be represented numerically and/or by color. For example, the risk levels may include a low risk assigned a first number and/or color (e.g., 1, green), a medium risk assigned a second number and color (e.g., 2, yellow), and a high risk assigned a third number and color (e.g., 3, red). The remote storage 110 may perform a risk assessment of the icy conditions 104 based on factors including, but not limited to, size or area of the icy conditions 104, location of the icy conditions 104 (e.g., road 106, sidewalk 204, parking lot, etc.), a traffic level of the location of the icy conditions 104 (e.g., interstate highway, alley, sidewalk adjacent to a major transportation hub, etc.), or other weather conditions (temperature, humidity, etc.) to determine which icy conditions 104 are assigned to which level. For example, an icy condition 104 detected in a low traffic area that is small in size may be designated a low risk level and an icy condition 104 detected in a high traffic area that is large in size may be designated a high risk level. Alternatively, the processor 302 of the vehicle 102, additional vehicles 202, and portable devices 208 may perform the risk assessment prior to transmitting the information to the remote storage 110.

The remote storage 110 may also include the map 114 of the icy conditions 104, which may be updated in real-time based on the data received by the remote storage 110. The map 114 may identify the icy conditions 104 at the locations associated with the detection of the icy conditions 104. The locations of the icy conditions 104 may be identified on the map with a corresponding risk level. For example, a location designated as a high risk icy condition 104 may be depicted in the color red and/or may include a number 3 adjacent to the icy condition 104 identified on the map 114. The map 114 and the other data related to the icy conditions 104 may be transmitted to any of the vehicle 102, additional vehicles 202, portable devices 208, or any other device capable of communicating with the remote storage 110 via the relay stations 112.

The additional vehicles 202 may be, in some examples, substantially similar to the example vehicle 102 and include a processor 302, ice detection sensors 304, a GPS module 306, an antenna 308, an HMI 310, a driver assistance system 312, and vehicle handling systems 314 and, thus, may be operative to transmit and receive information related to detected icy conditions 104 in a manner similar or identical to the vehicle 102. Alternatively, the additional vehicles 202 may include any subset of the components described in conjunction with the example vehicle 102. For example, the additional vehicles 202 may include only a processor, a GPS module 306, an antenna 308, and an HMI 310 operative to communicate with the remote storage 110 via the relay stations 112. In such example additional vehicles 202, the additional vehicles 202 may receive information related to icy conditions 104 but may not be operative to detect icy conditions 104 and, thus, would not transmit detected icy conditions 104 to the remote storage 110.

The example portable device 208 may include any of the smartphone 212, the smart watch 210, a tablet, or any other device capable of using the FordPass application 214. The portable device 208 receives information related to the icy conditions 104 from the remote storage 110 either directly or via one or more of the relay stations 112. The portable device 208 may also be operative to communicate directly with the vehicle 102 or additional vehicles 202. In some examples, the portable device 208 is associated with the driver of the vehicle 102 and receives notifications related to icy conditions 104 detected by the vehicle 102 and/or icy conditions 104 received from the remote storage 110. For example, the portable device 208 associated with the driver of the vehicle 102 may receive notifications when entering or exiting the vehicle 102 if the ice detection sensors 304 of the vehicle 102 detect icy conditions 104 adjacent the door 306 of the vehicle 102. The portable device 208 may alternatively be associated with the pedestrian 216 who may not own a Ford vehicle capable of detecting icy conditions 104, but is able to receive notifications and/or the map 114 of icy conditions 104 via the portable device 208. The FordPass application 214 on the portable device 208 is operative to provide information collected by Ford vehicles having ice detection sensors 304 to anyone with a portable device 208 including the FordPass application 214.

The relay stations 112 may provide alerts to the vehicle 102, additional vehicles 202, and portable devices 208 related to the detected icy conditions 104 based on a location determined using the GPS satellite 108 and/or corresponding GPS modules. The vehicles 102, additional vehicles 202, and portable devices 208 may determine (e.g., based on location, user settings in the FordPass application 214, etc.) about which icy conditions 104 to alert the driver/user. For example, the FordPass application 214 user may change settings of the application so that the portable device 208 receives all alerts for all icy conditions, or may only receive alerts for icy conditions 104 in proximity to (e.g., within 500 feet) to the current location of the portable device 208, a route of the user, or predicted future location(s) of the user.

Additionally or alternatively, the remote storage 110 may only communicate icy conditions 104 to the vehicle 102, additional vehicles 202, and portable devices 208 that are within range of the same relay station 112 as the vehicle 102 that reported the icy conditions 104 at the time the data was communicated. For example, if the vehicle 102 is in range of the relay station 112 when the icy conditions 104 are detected, the additional vehicles 202 and portable devices 208 within range of the relay station 112 will receive the alert, but if the vehicle 102 is not in range of the relay station 112 when the icy conditions 104 are detected, the additional vehicles 202 and portable devices 208 will not receive the alert. However, the vehicle 102 may receive alerts associated with different relay stations 112 as the vehicle 102 travels along a route.

While an example manner of implementing the example apparatus 300 of FIG. 3 is illustrated, one or more of the elements, processes and/or devices illustrated in FIG. 3 may be combined, divided, re-arranged, omitted, eliminated and/or implemented in any other way. Further, the example processor 302, the example ice detection sensors 304, the example GPS module 306, the example antenna 308, the example HMI 310, the example driver assistance system 312, the example vehicle handling system 314, the example relay stations 112, the example portable devices 208, the example remote storage 110, the example map 114, and/or, more generally, the example apparatus 300 of FIG. 3 may be implemented by hardware, software, firmware and/or any combination of hardware, software and/or firmware. Thus, for example, any of the example processor 302, the example ice detection sensor 304, the example GPS module 306, the example antenna 308, the example HMI 310, the example driver assistance system 312, the example vehicle handling system 314, the example relay station 112, the example portable devices 208, the example remote storage 110, the example map 114, and/or, more generally, the example apparatus 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 302, the example ice detection sensor 304, the example GPS module 306, the example antenna 308, the example HMI 310, the example driver assistance system 312, the example vehicle handling system 314, the example relay station 112, the example portable devices 208, the example remote storage 110, the example map 114, and/or, more generally, the example apparatus 300 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 300 of FIG. 3 may include one or more elements, processes and/or devices in addition to, or instead of, those illustrated in FIG. 3, and/or may include more than one of any or all of the illustrated elements, processes and devices.

Example flowcharts representative of example methods for implementing the apparatus 300 of FIG. 3 are shown in FIGS. 4-8. The methods may be implemented using machine readable instructions that comprise a program for execution by a processor, such as the processor 302, shown in the example apparatus 300 and the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 302, but the entire program and/or parts thereof could alternatively be executed by a device other than the processor 302 and/or embodied in firmware or dedicated hardware. Further, although the example program is described with reference to the flowcharts illustrated in FIGS. 4-8, many other methods of implementing the example apparatus 300 may alternatively be used. For example, the order of execution of the blocks may be changed, and/or some of the blocks described may be changed, eliminated, or combined.

As mentioned above, the example methods of FIGS. 4-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example methods of FIGS. 4-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 4:
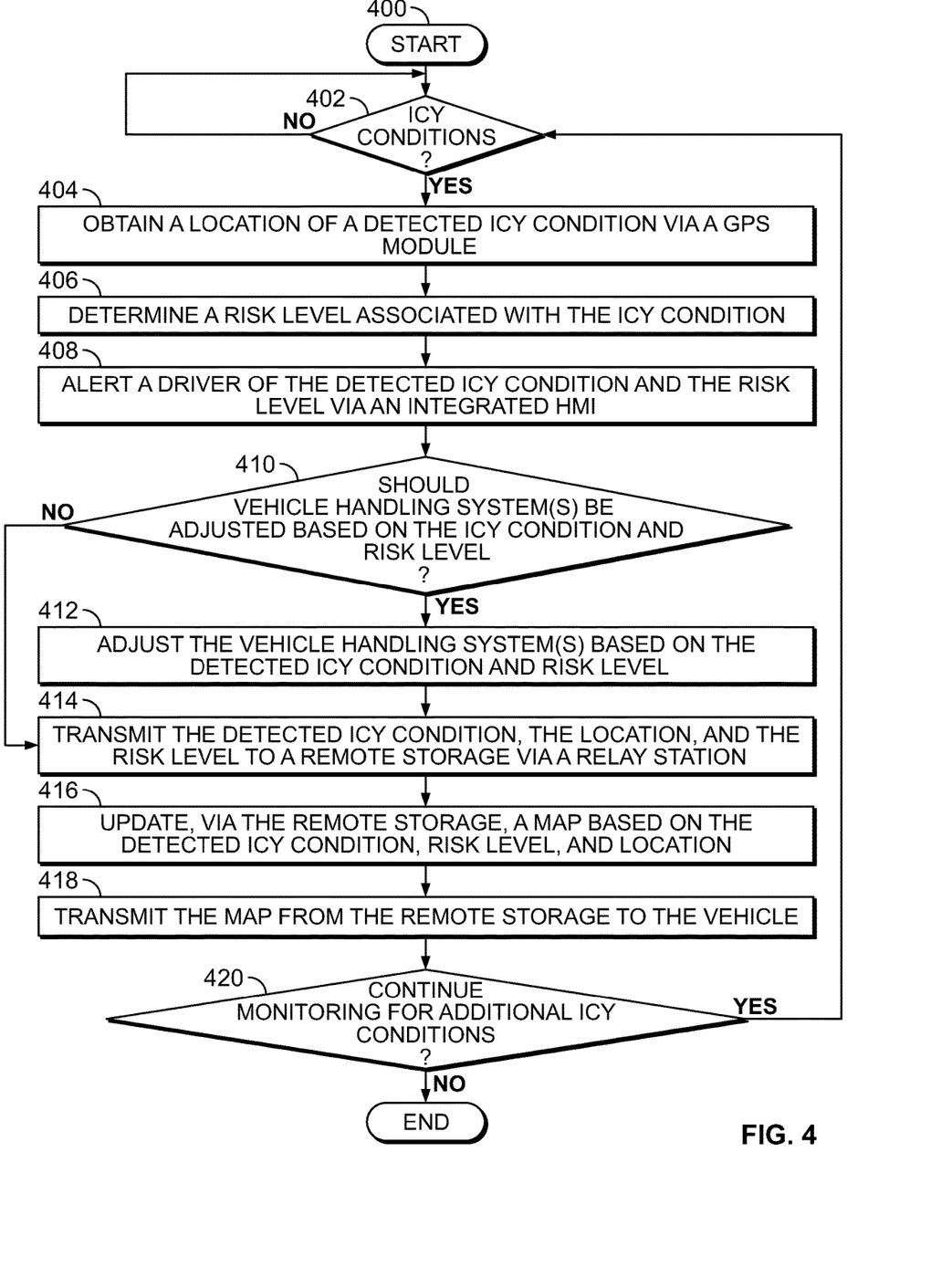
FIGS. 4-8 are example flowcharts representative of the example methods implemented by the apparatus described herein.

FIG. 4 is an example flowchart representative of an example method 400 implemented by the apparatus described herein. The example method 400 relates to the example vehicle 102 updating the remote storage 110, alerting the driver of the vehicle 102, and adjusting control of the vehicle 102. The method 400 begins when icy conditions are detected, via the ice detection sensors 304, on the road surface 106 adjacent to the vehicle 102 (block 402). If any icy condition 104 is detected, a location of the icy condition 104 is determined using a GPS satellite 108 and GPS receiver or module 306 of the vehicle 102 (block 404). The icy condition 104 is assessed and a risk level associated with the icy condition 104 is determined (block 406). Alternatively, the risk level associated with the icy condition 104 may be determined later by the remote storage 110. The driver may then be alerted of the detected icy condition 104 and the risk level associated with the detected icy condition 104 (if the risk level was determined by the processor 302) via the integrated HMI 310 (block 408).

The method 400 may then determine if the vehicle handling system 314 is to be adjusted based on the icy condition 104, the risk level, and the current operation of the vehicle handling system 314 (block 410). If the processor 302 determines that the vehicle handling system 314 should be adjusted, the processor 302 adjusts the vehicle handling system 314 based on the risk level and icy conditions 104 (block 412), otherwise control proceeds to block 414.

The processor 302 may transmit the detected icy condition 104, risk level, and/or location to the remote storage 110 via the relay station 112 (block 414). The remote storage 110 may then update the map 114 in real time or substantially real time based on the transmitted detected icy condition 104, risk level, and location (block 416). The map 114 may then be transmitted from the remote storage 110 to the vehicle 102 (block 418). The processor 302 then determines whether to continue monitoring for additional icy conditions 104 (block 420). If the processor 302 is to continue monitoring for additional icy conditions 104, control returns to block 402, otherwise, the method 400 ends.

Figure 5:
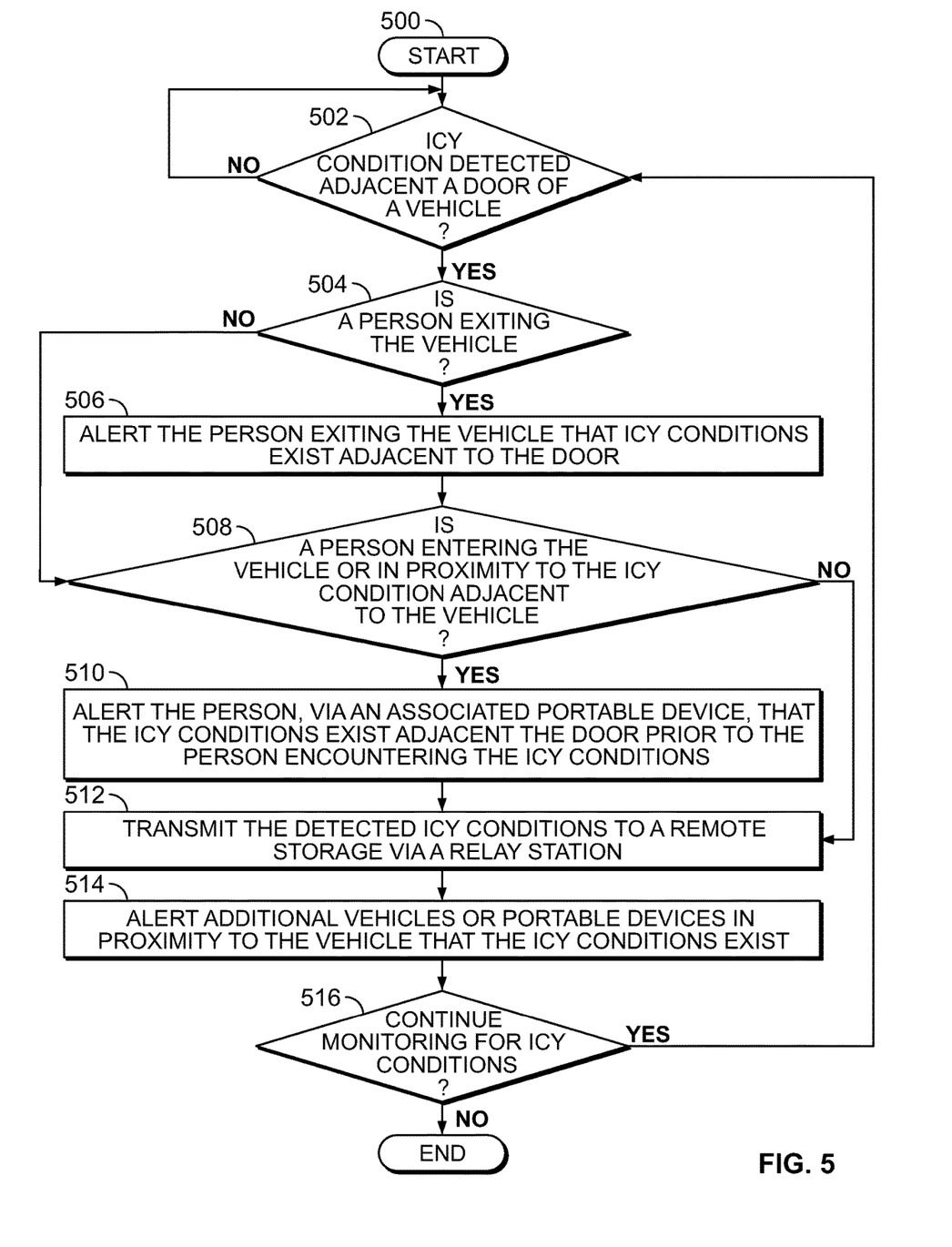

FIG. 5 is an example flowchart representative of an example method 500 implemented by the apparatus described herein to warn drivers and/or passengers of icy conditions adjacent to doors 206 of vehicles 102. The example method 500 begins when icy conditions 104 are detected, via the ice detection sensors 304, adjacent to the door 206 of the vehicle 102 (block 502). If such an icy condition is detected, the processor 302 of the vehicle 102 may determine that a person (e.g., the driver, a passenger) is exiting the vehicle 102 via the door 206 adjacent to the detected icy conditions 104 (block 504). The processor 302 alerts the driver or passenger exiting the vehicle 102 that the icy conditions 104 exist adjacent to the door 206 using the HMI 310 (block 506).

In some examples, the processor 302 of the vehicle 102 is operative to detect that a person may be entering or returning to the vehicle 102 based on detecting that a portable device 208 associated with the driver or passenger is in proximity to the vehicle 102 (block 508). If the person is proximate to or entering the vehicle 102 at block 508, the processor 302 may transmit an alert to the portable device 208 associated with the driver or passenger if the ice detection sensors 304 detected icy conditions 104 in proximity to the door 206 of the vehicle 102 (block 510). The processor 302 may also transmit the icy conditions 104 detected adjacent to the door 206 to the remote storage 110 (block 512). Additional vehicles 202 in proximity to the detected icy conditions 104 may be alerted of the location of the icy conditions 104 (block 514). Additionally or alternatively, a portable device 208 using the FordPass application 214 may also be operative to warn a driver or user approaching a vehicle 102 that icy conditions 104 exist adjacent to the door 206. The processor 302 of the vehicle 102 may determine whether to continue monitoring for icy conditions 104 adjacent to the vehicle 102 (block 516). If the processor 302 decides to continue monitoring, the method 500 returns to block 502. If the processor 302 decides not to continue monitoring, the method 500 ends.

Figure 6:
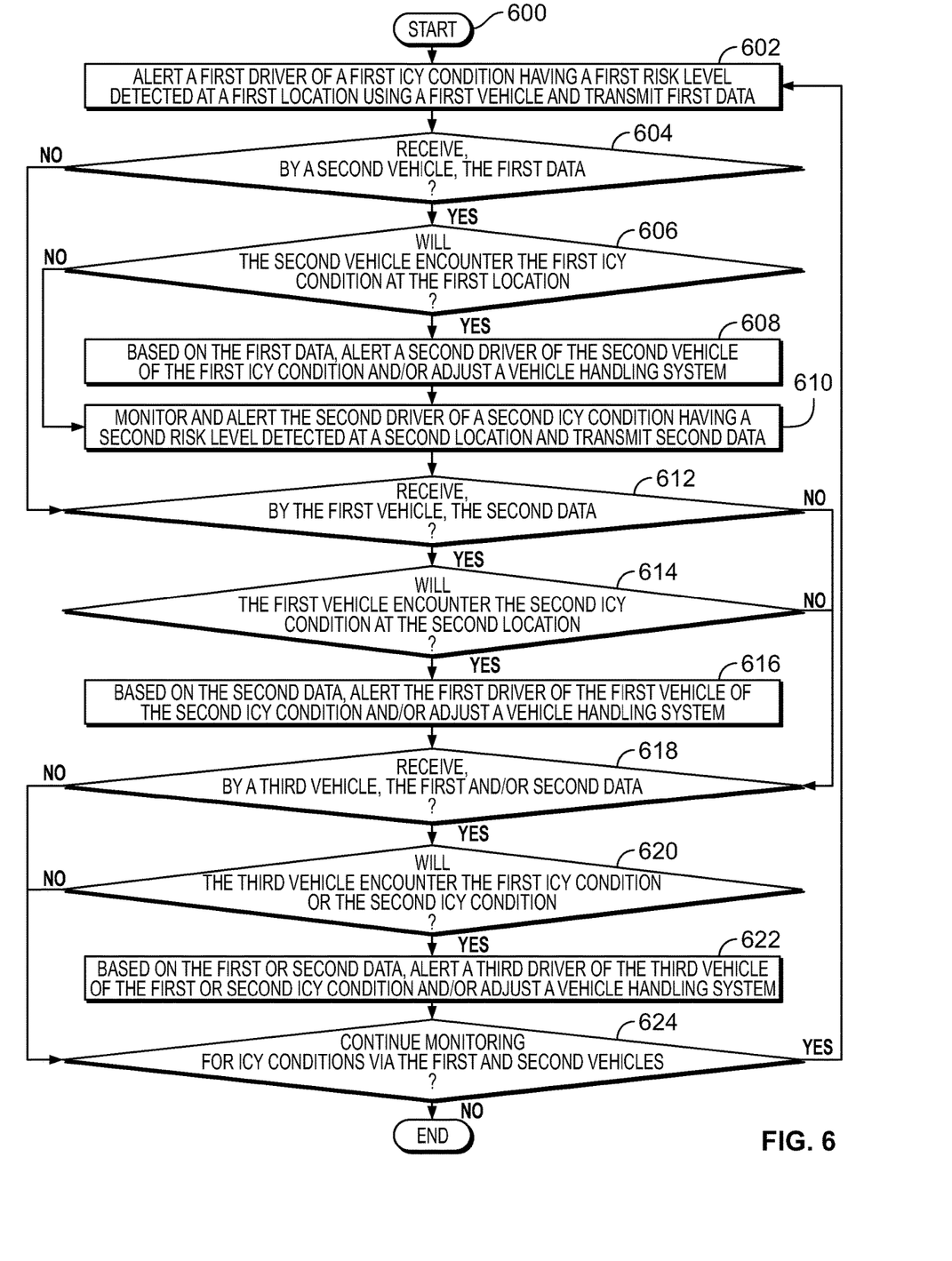

FIG. 6 is an example flowchart representative of an example method 600 implemented by the apparatus described herein. Particularly, the example method 600 relates to vehicle-to-vehicle (e.g., from the vehicle 102 to additional vehicles 202) communication of icy conditions 104 on a road 106. The example method 600 begins by alerting a first driver of a first icy condition having a first risk level detected at a first location using a first vehicle and transmitting first data corresponding to the first icy condition (block 602). Any combination of blocks 402-420 of the method 400 of FIG. 4 may be combined and implemented as block 602 of the method 600. If a second vehicle (e.g., one of the additional vehicles 202) receives the first data (block 604), a processor of the second vehicle, which may be similar to processor 302, determines if the second vehicle is likely to encounter the first icy condition 104 at the first location based on a path of travel of the second vehicle 202 (block 606). The path of travel may be determined based on navigation (e.g., using the HMI of the second vehicle 202 or a GPS navigator) of the second vehicle 202, a usual route driven by the driver (e.g., between home and work), a proximity to the first icy condition 104, a determined destination location (e.g., based on the calendar event location connected to the device of the driver), and a likely path to the destination location. If the second vehicle 202 is likely to encounter the first icy condition 104, the processor 302 may alert a second driver of the second vehicle 202 based on the first data representing the first icy condition 104 at the first location and/or may adjust a vehicle handling system 314 of the second vehicle 202 based on the first data (block 608). If the second vehicle 202 is not likely to encounter the first icy condition 104, the processor 302 of the second vehicle 202 may monitor or continue to monitor, via ice detection sensors 304 of the second vehicle 202, for icy conditions 104 adjacent to the second vehicle 202. If the second vehicle detects a second icy condition 104 adjacent the second vehicle, the second driver may be alerted of the second icy condition 104 having a second risk level detected at a second location and transmit second data corresponding to the second icy condition 104 (block 610). As with block 602, any combination of blocks 402-420 of the method 400 of FIG. 4 may be combined and implemented as block 610 of the method 600.

In some examples, the first vehicle 102 may receive the second data related to icy conditions 104 detected by the second vehicle 202 (block 612). If the first vehicle receives the second data, the processor 302 of the first vehicle 102 determines if the first vehicle 102 is likely to encounter the second icy condition 104 based on a path of travel of the first vehicle 102 (block 614). If the first vehicle 102 is likely to encounter the second icy condition 104, the driver of the first vehicle 102 is alerted about the second icy condition 104 based on the second data and/or the first vehicle 102 adjusts a vehicle handling system 314 based on the second data (block 616). If the first vehicle 102 is not likely to encounter the second icy condition 104, the processor 302 does not warn the first driver and control proceeds to block 608.

In some examples, a third vehicle (e.g., another of the additional vehicles 202), which may not be capable of ice detection, may receive the first and/or the second data (block 618). If the third vehicle receives the first and/or second data, a processor of the third vehicle, similar to the processor 302, or a portable device 208 associated with a third driver of the third vehicle 202 determines if the path of travel of the third vehicle 202 is likely to encounter the first and/or second icy condition 104 (block 620). If the third vehicle 202 is likely to encounter the first and/or second icy condition 104, the third vehicle 202 or portable device 208 associated with the third vehicle 202 may alert the driver of the third vehicle 202 and/or adjust a vehicle handling system 314 of the third vehicle 202 (block 622). In some examples, the third vehicle does not include a vehicle handling system that can be adjusted by the processor of the vehicle. The respective processors 302 of the first and second vehicles 102, 202 determine whether to continue monitoring for icy conditions 104 adjacent the respective vehicles 102, 202 (block 624). If one or more of the respective processors 302 of the vehicles 102, 202 is to continue monitoring for icy conditions 104, the control returns to block 602. If neither of the processors 302 is to continue monitoring for icy conditions 104, the method 600 ends.

Figure 7:
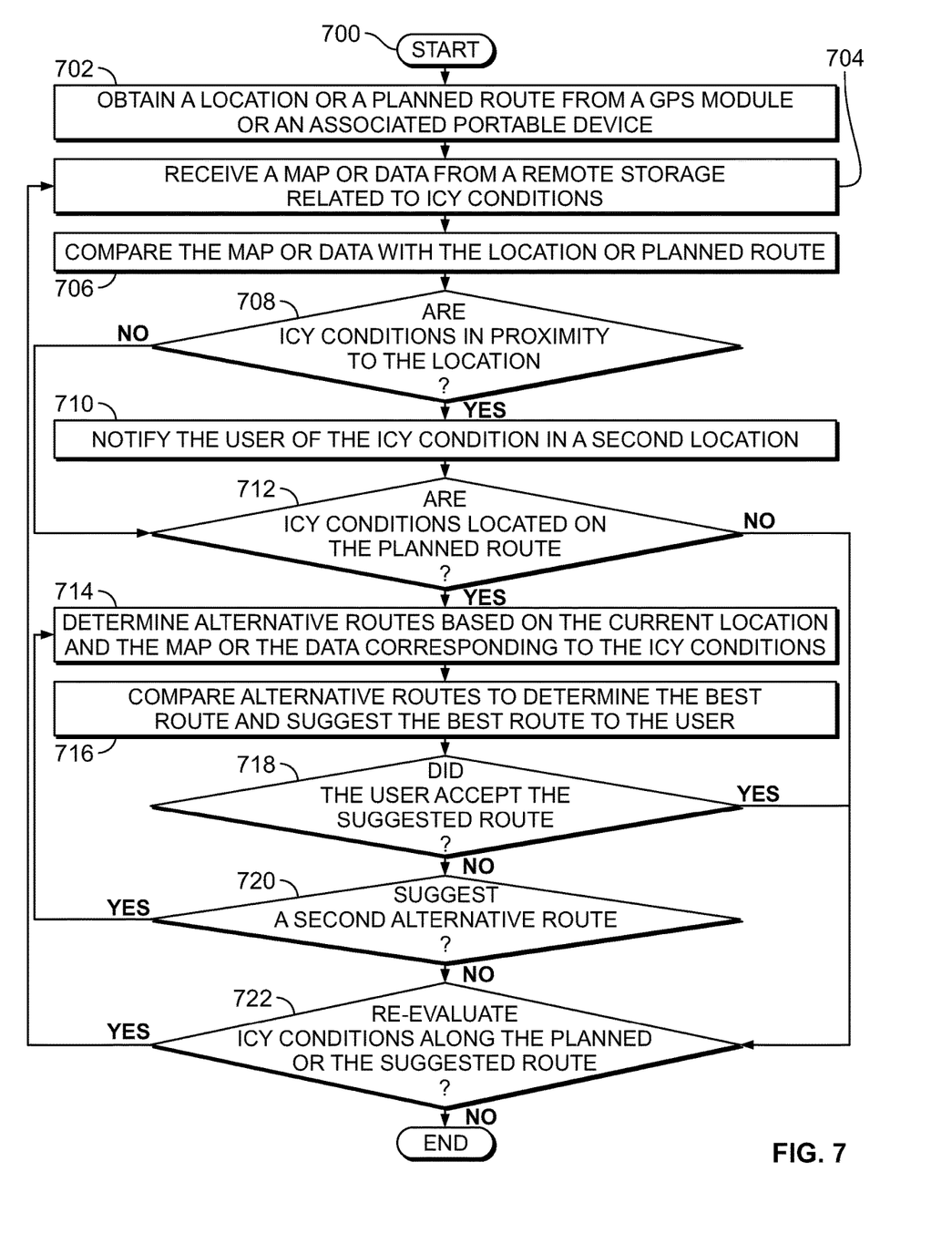

FIG. 7 is an example flowchart representative of an example method 700 implemented by the apparatus described herein to obtain information related to icy conditions 104 from a remote storage 110. The example method 700 begins by obtaining a location and/or a planned route (e.g., using a navigation application) from the GPS module 306 or the portable device 208 (e.g., a device accessing the FordPass application 214) (block 702). The processor 302 of the vehicle 102 or the portable device 208 may receive the map 114 or data from the remote storage 110 related to the icy conditions 104 detected (block 704). The processor 302 or portable device 208 may then compare the map 114 or data with the location or planned route (block 706). Based on the comparison, the processor 302 or portable device 208 can determine if the icy conditions 104 are in proximity to the current location (block 708). If the icy conditions 104 are in proximity to the current location, the user may receive a notification of the icy condition 104 and a risk level associated with the icy condition 104 (block 710).

The processor 302 or portable device 208 may also determine, based on the comparison, if the icy conditions 104 are located along the planned route (block 712). If the icy conditions 104 are located along the planned route, the portable device 208 or the processor 302 may determine alternative routes based on the current location and the map 114 or data related to corresponding to the icy conditions 104 (block 714). The alternative routes may then be compared and the best route is selected and suggested to the user (block 716). The user may or may not accept the change in navigation using the suggested route (block 718). If the user does not select the suggested route, the processor 302 or portable device 208 may decide to suggest a second alternative route (block 720) and return to block 714 to determine a second alternative route to suggest. The processor 302 or portable device 208 determines whether or not to re-evaluate the icy conditions 104 along the route (722). For example, the processor 302 or portable device 208 may choose to re-evaluate if new data related to the icy conditions 104 is available from the remote storage 110. If the icy conditions 104 are not re-evaluated, the method 700 ends.

Figure 8:
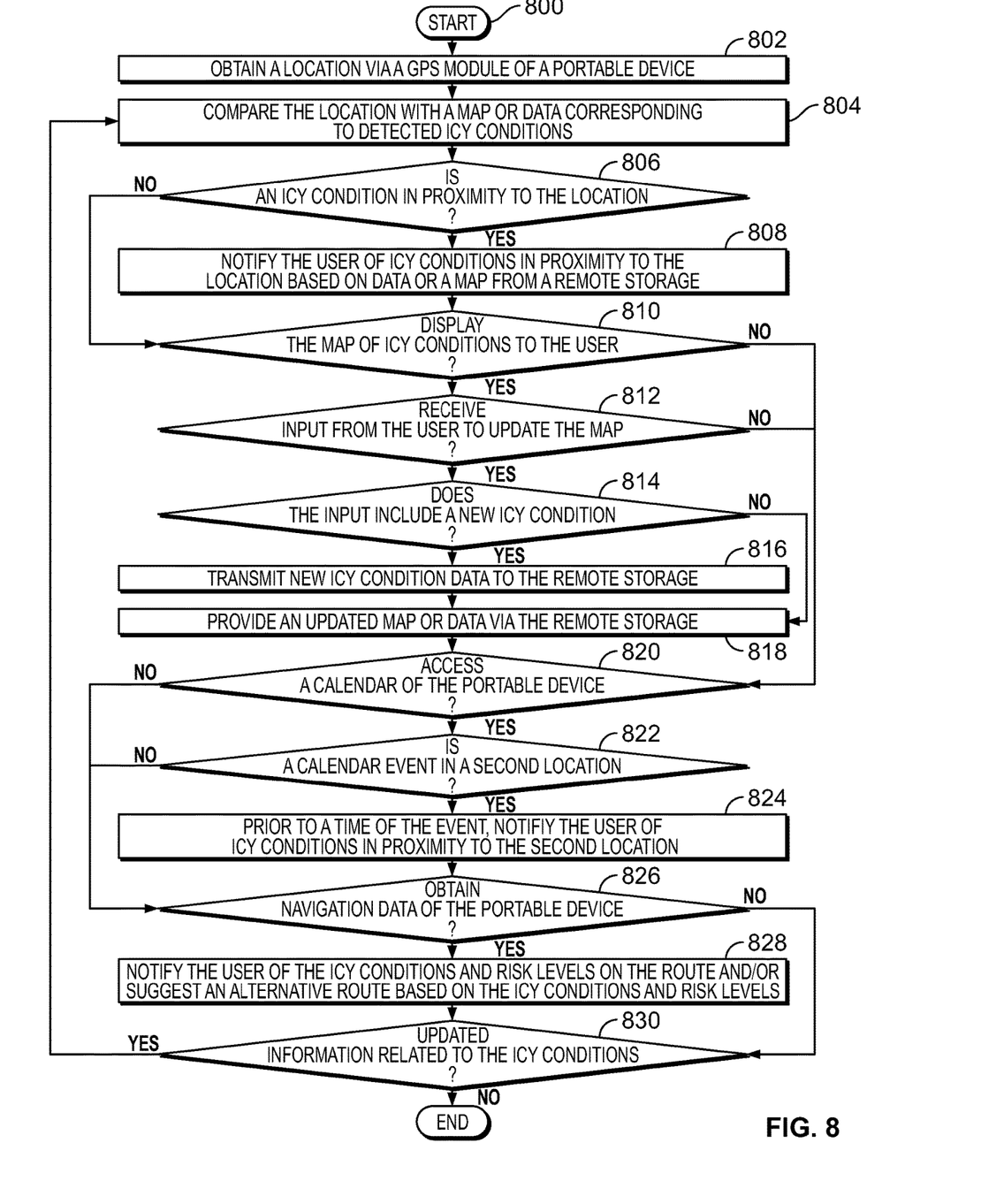

FIG. 8 is an example flowchart representative of an example method 800 implemented by the apparatus described herein. Particularly, the example method 800 relates to using a portable device 208 and/or FordPass application 214 on a portable device 208 to access the data from the remote storage 110. The method 800 of FIG. 8 begins by obtaining location data via a GPS module 306 of a portable device 208 associated with a user (e.g., the driver, the pedestrian 216, the passenger, etc.) (block 802). The portable device 208 may compare the location with the map 114 or data from the remote server 110 corresponding to the icy conditions 104 (block 804). If icy conditions 104 are in proximity to the location (block 806), the user is notified via the FordPass application 214 on the portable device 208 that icy conditions 104 are in proximity to the location of the portable device (block 808). Alternatively or additionally, the FordPass application 214 of the portable device 208 receives a prompt from the user to display the map 114 or data from the remote storage 110 that includes icy conditions 104 and risk levels near the current location of the portable device 208 or a second location specified by the user (block 810). The FordPass application 214 may then determine if other input is received from the user to update the map 114, which may include the user requesting the map 114 be refreshed (e.g., updated) or the user adding new data related to icy conditions 104 (block 812). If the input from the user includes new data related to icy conditions 104 (block 814), the FordPass application 214 of the portable device 208 transmits the new data to the remote storage 110 (block 816). The FordPass application 214 also provides an updated map 114 or data identifying the updated icy conditions 104, the locations of the icy conditions 104 and the risk level associated with the icy conditions 104 (block 818).

In some examples, the FordPass application 214 may obtain calendar data from the portable device 208 (e.g., from a calendar application of the mobile device) (block 820). If the FordPass application accesses the calendar and determines a calendar event is in a second location (block 822), the processor or FordPass application 214 may notify the user, prior to the time of the calendar event, of icy conditions 104 near the second location based on data or the map 114 from the remote storage 110 (block 824). In some examples, the FordPass application 214 may also obtain a predicted or planned route based on navigation data from the portable device 208, which may include a typical route taken by the user between the first location (e.g., the current location) and the second location (e.g., a usual route the user travels between home and work) (block 826). If the FordPass application 214 obtains navigation data from the portable device 208, the FordPass application 214 notifies the user of the icy conditions 104 and risk levels of the icy conditions 104 along the route obtained from the navigation data and/or may suggest an alternative route to the user based on the icy conditions 104 and risk levels (block 828). The FordPass application 214 of the portable device 208 determines whether updated information related to the icy conditions 104 is available from the remote storage 110 and/or whether to continue monitoring for icy conditions 104 (block 830). If the FordPass application 214 of the portable device 208 is to continue monitoring for icy conditions 104, the FordPass application 214 returns to block 802. If the FordPass application 214 does not decide to continue monitoring for icy conditions 104, the method 800 ends.

Figure 9:
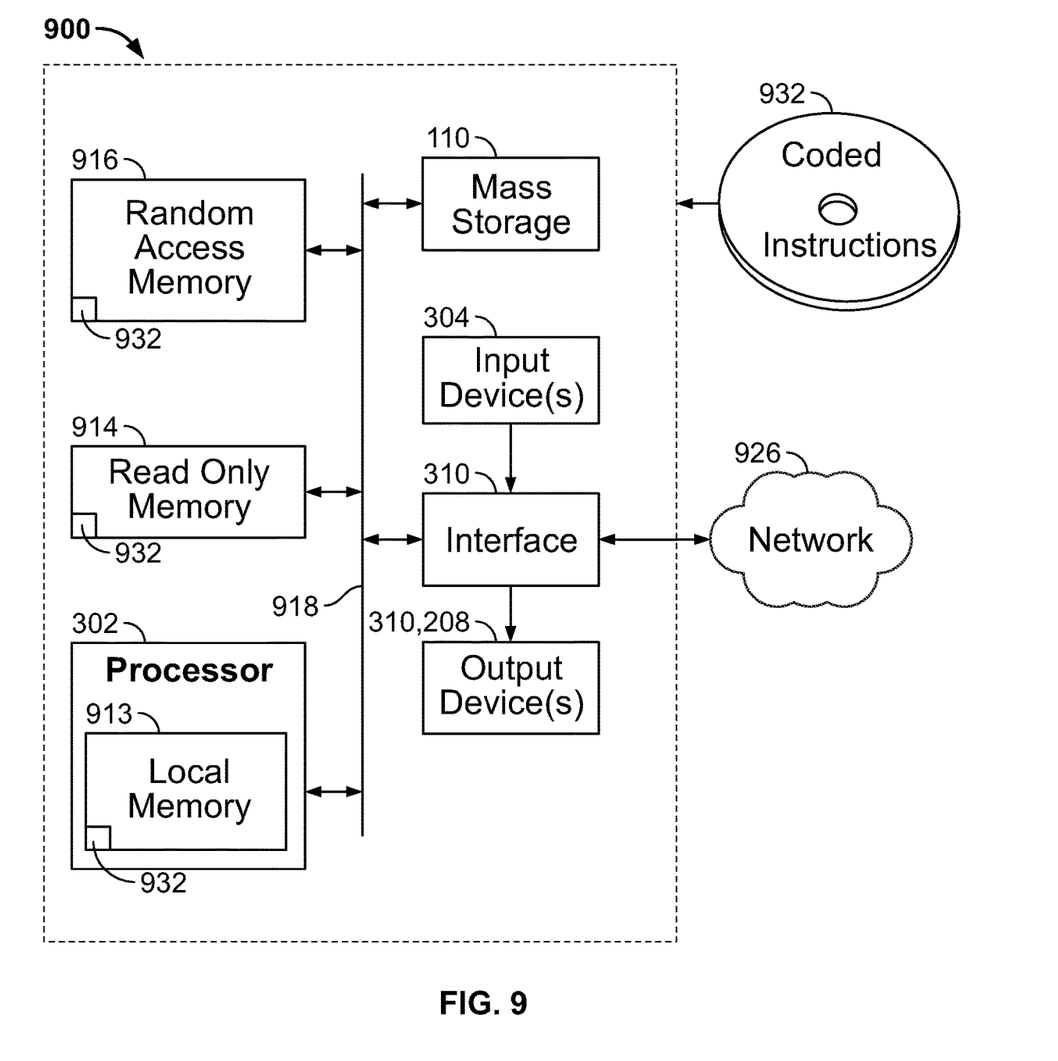
FIG. 9 is an example processor platform that may be used with the example apparatus of FIG. 3 and/or the example methods of FIGS. 4-8.

FIG. 9 is a block diagram of an example processor platform 900 capable of executing instructions to implement the methods of FIGS. 4-8 and the apparatus of FIG. 3. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor, such as processor 302 of vehicle 102. The processor 302 of the illustrated example is hardware. For example, the processor 302 can be implemented by one or more integrated circuits, logic circuits, microprocessors or controllers from any desired family or manufacturer.

The processor 302 of the illustrated example includes a local memory 913 (e.g., a cache). The processor 302 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices, such as the ice detection sensors 304, are connected to the interface circuit 920. The input device(s) 304 permit(s) a user to enter data and commands into the processor 302. Additional input device(s) (e.g., the HMI 310) can be implemented by, for example, an audio sensor, a microphone, a camera (still or video), a keyboard, a button, a mouse, a touchscreen, a track-pad, a trackball, isopoint and/or a voice recognition system.

One or more output devices (e.g., the HMI 310, the portable devices 208) are also connected to the interface circuit 310 of the illustrated example. The output devices 310, 208 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 310 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices, such as remote storage 110 for storing software and/or data. Examples of such mass storage devices 110 include floppy disk drives, hard drive disks, compact disk drives, Blu-ray disk drives, RAID systems, and digital versatile disk (DVD) drives.

Coded instructions 932 to implement the methods of FIGS. 4-8 may be stored in the mass storage device 110, in the volatile memory 914, in the non-volatile memory 916, and/or on a removable tangible computer readable storage medium such as a CD or DVD.

From the foregoing, it will be appreciated that the above disclosed methods, apparatus and articles of manufacture enable one or more vehicles, or portable devices in communication with a remote server via relay stations to provide to a user alerts or warnings related to icy conditions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a sensor configured to detect an icy condition at a location nearby a vehicle; and
   a processor configured to:
      determine that a pedestrian will encounter the icy condition based on a route of a navigation application of a portable device of the pedestrian; and
      suggest, on the navigation application and based on the determination that the pedestrian will encounter the icy condition on the route of the navigation application, an alternative route based on the icy condition.

2. The apparatus of claim 1, wherein the processor is further configured to determine that a passenger is exiting the vehicle based on at least one of the vehicle being in a parked position, an engine of the vehicle being off, or a door of the vehicle being open.

3. The apparatus of claim 2, further comprising a human-machine interface, wherein the processor is further configured to determine a risk level of the icy condition, and wherein the human-machine interface is configured to alert the passenger based on the risk level associated with the icy condition.

4. The apparatus of claim 3, wherein the processor is further configured to cause to alert the passenger using a first alert type if the risk level of the icy condition is low, and a second alert type if the risk level of the icy condition is high.

5. The apparatus of claim 1, wherein the processor is further configured to:
   receive a notification of a second icy condition detected by a second vehicle in a second location; and
   cause to alert the passenger based on a proximity of the vehicle to the second location.

6. The apparatus of claim 5, further comprising a human-machine interface, wherein the notification of the second icy condition in the second location includes a map, the map defining the second location and a second risk level of the second icy condition, the human-machine interface operative to display the map to the passenger.

7. The apparatus of claim 1, further comprising a human-machine interface, wherein the human-machine interface includes at least one of a display or an audio system, and the alert includes at least one of an audible alert via the audio system or a visual alert via the display.

8. The apparatus of claim 1, wherein the sensor includes at least one of an infrared sensor, a temperature sensor, or a humidity sensor.

9. A method comprising:
   detecting, via a sensor, an icy condition adjacent a door of a vehicle;
   detecting, based on detecting that a portable device associated with a passenger is in proximity of the vehicle, that the passenger is returning to the vehicle; and
   alerting, based on detecting that the passenger is returning to the vehicle and prior to the passenger entering the vehicle, the passenger of the icy condition adjacent to the door.

10. The method of claim 9, further comprising:
   determining that the passenger is exiting the vehicle through the door; and
   alerting, prior to the passenger exiting the vehicle and via a human-machine interface, the passenger that the icy condition exists,
   wherein determining that the passenger is exiting the vehicle includes at least one of determining that the vehicle is in a parked position, determining that an engine is off, or detecting the door is open.

11. The method of claim 9, wherein alerting the passenger prior to entering the vehicle includes transmitting an alert to the portable device associated with the passenger when the portable device is in proximity of the vehicle, wherein the portable device is paired with the vehicle.

12. The method of claim 9 further comprising transmitting information indicative of the icy condition and a location of the icy condition to a remote server, the remote server to relay the icy condition information and the location to another vehicle and another portable device in proximity to the location.

13. A method comprising:
   detecting, at a first time, an icy condition at a first location via a sensor of a vehicle;
   transmitting data indicative of the icy condition to a remote server;
   determining, at a second time and via a portable device associated with a pedestrian external to the vehicle, that the pedestrian is in proximity to the icy condition at the first location; and
   transmitting, based on the determination that the pedestrian is in proximity of the icy condition at the first location, an alert from the remote server to the portable device indicating the icy condition at the first location.

14. The method of claim 13 further comprising transmitting the alert indicating the icy condition to a second vehicle in proximity to the first location.

15. The method of claim 13, wherein the alert is transmitted via a relay station in communication with the vehicle and the portable device.

16. The method of claim 13 further comprising transmitting information indicative of a second detected icy condition detected at a second location.

* * * * *